United States Patent
Huang et al.

(10) Patent No.: US 12,010,977 B2
(45) Date of Patent: Jun. 18, 2024

(54) METHOD FOR ARTIFICIAL REARING OF PORCUPINE PUFFERFISH FRY IN INDOOR CEMENT POND

(71) Applicant: HAINAN TROPICAL OCEAN UNIVERSITY, Hainan (CN)

(72) Inventors: Hai Huang, Hainan (CN); Pan Chen, Hainan (CN); Chunyou Cai, Hainan (CN); Liu Cao, Hainan (CN); Erdong Wang, Hainan (CN)

(73) Assignee: HAINAN TROPICAL OCEAN UNIVERSITY, Hainan (CN)

( * ) Notice: Subject to any disclaimer, the term of this patent is extended or adjusted under 35 U.S.C. 154(b) by 463 days.

(21) Appl. No.: 17/369,718

(22) Filed: Jul. 7, 2021

(65) Prior Publication Data
US 2022/0007619 A1 Jan. 13, 2022

(30) Foreign Application Priority Data
Jul. 8, 2020 (CN) .......................... 202010652135.1

(51) Int. Cl.
| A01K 61/17 | (2017.01) |
| A01K 61/13 | (2017.01) |
| A01K 61/85 | (2017.01) |
| A01K 61/95 | (2017.01) |
| A01K 63/10 | (2017.01) |

(52) U.S. Cl.
CPC .............. *A01K 61/17* (2017.01); *A01K 61/13* (2017.01); *A01K 61/85* (2017.01); *A01K 61/95* (2017.01); *A01K 63/10* (2017.01)

(58) Field of Classification Search
CPC ........ A01K 61/17; A01K 61/13; A01K 61/85; A01K 63/10
USPC ........................................................ 119/217
See application file for complete search history.

(56) References Cited

FOREIGN PATENT DOCUMENTS

| CN | 104082215 A | * | 10/2014 | |
| CN | 204518889 U | * | 8/2015 | |
| CN | 105432523 A | * | 3/2016 | ............. A01K 61/10 |
| CN | 107114283 A | * | 9/2017 | |
| CN | 108782365 A | * | 11/2018 | ............. A01K 61/10 |
| CN | 109644910 A | * | 4/2019 | ............. A01G 33/00 |
| CN | 110537505 A | * | 12/2019 | ............. A01K 61/10 |
| CN | 110915729 A | * | 3/2020 | |
| CN | 107155956 B | * | 6/2020 | ............. A01K 61/00 |
| CN | 111280091 A | * | 6/2020 | ............. A01K 61/10 |

(Continued)

*Primary Examiner* — Peter M Poon
*Assistant Examiner* — Angelica Alejandra Almeida Bonnin
(74) *Attorney, Agent, or Firm* — Tutunjian & Bitetto, P.C.

(57) ABSTRACT

Provided is a method for artificial rearing of porcupine pufferfish fries in indoor cement ponds. The method includes the following steps: indoor cement pond preparation, release hatched larvae into the indoor cement pond, feed and manage the larvae at different sub-stages of the fry rearing stages, water quality management during fry rearing, separate ponding of fries based on size of the fries, and transfer the fries to net cages or outdoor ponds when the fries reach a minimum length. The indoor cement pond preparation step may include disinfecting the pond and regulating the water quality. During the rearing stage, the method may include stimulating anti-stress physiological response of the larvae. The method may transfer fries with an average total length of more than 2.0 cm into net cages or outdoor ponds for aquaculture after 45 days of the rearing stage.

6 Claims, 1 Drawing Sheet

(56) References Cited

FOREIGN PATENT DOCUMENTS

| | | | | |
|---|---|---|---|---|
| CN | 107751050 | B | * | 7/2020 |
| JP | 2015002694 | A | * | 1/2015 |

* cited by examiner

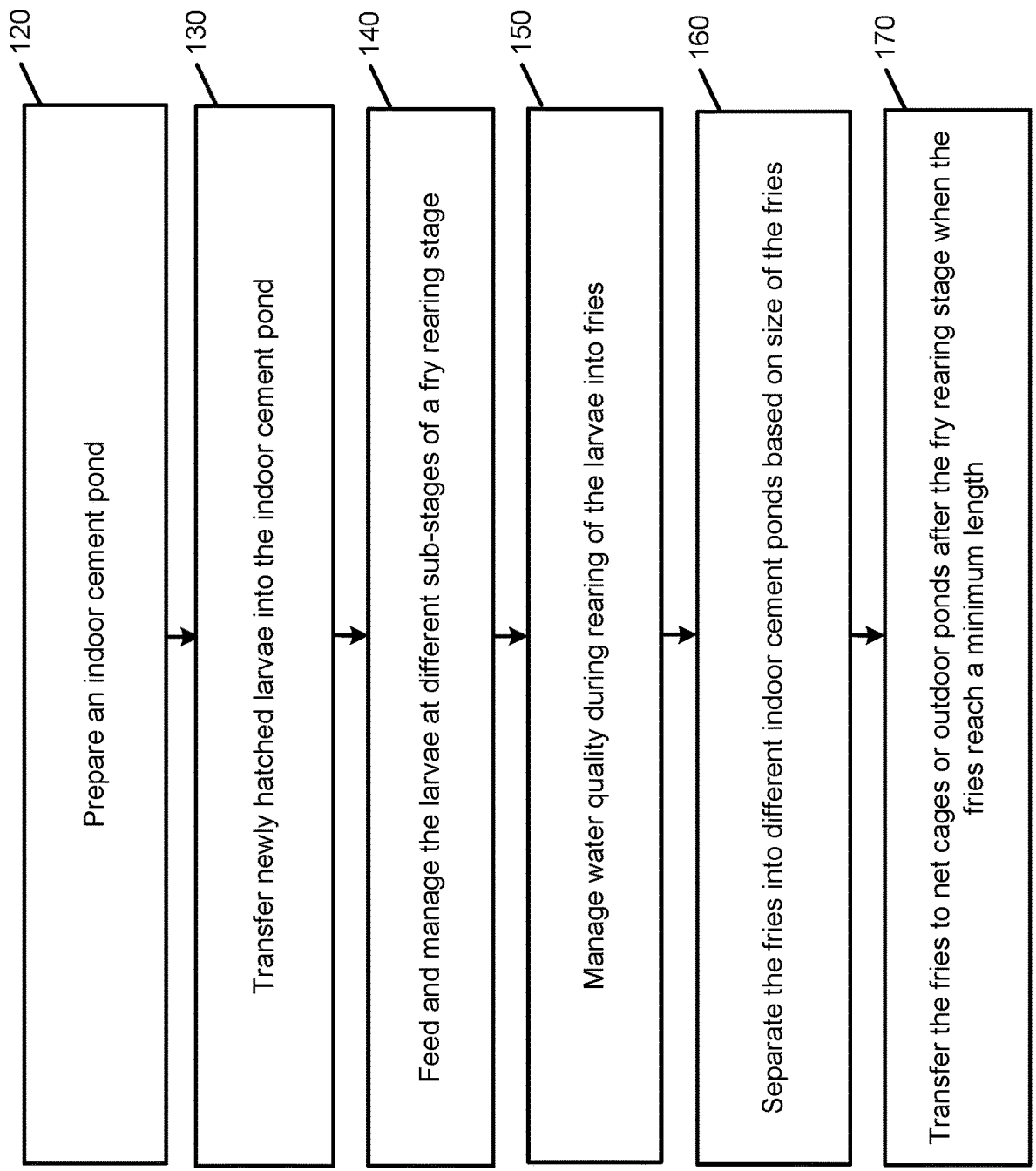

METHOD FOR ARTIFICIAL REARING OF PORCUPINE PUFFERFISH FRY IN INDOOR CEMENT POND

RELATED APPLICATION

This application claims the benefit of Chinese Patent Application No. 202010652135.1 filed on Jul. 8, 2020, which is incorporated herein by reference.

TECHNICAL FIELD

The present disclosure relates to the field of aquaculture, and in particular to a method for artificial rearing of porcupine pufferfish fries in indoor cement ponds.

BACKGROUND ART

Common name: Porcupine pufferfish; scientific name: *Diodon hystrix*. Porcupine pufferfish belong to the family Diodontidae under the order Tetraodontiformes of the class Actinopterygii. The fish is distributed in subtropical waters of all oceans worldwide. The type locality of this species is in India. When attacked, the fish will inhale seawater to inflate the body into a spherical shape, and stick out spines so that predators cannot swallow it. The fish is carnivorous, feeds on zoobenthos, and is poisonous. The body length of the porcupine pufferfish can reach 91 cm. The body is short and wide; the mouth is small, and each jaw in the mouth has a well-developed tooth plate. Except for lips and caudal peduncle, spines are densely covered with long spines specialized by scales. The spines are short, with small black spots on the body; each fin is short and round, with small black spots; there are 14-17 dorsal soft rays; there are 14-16 anal soft rays.

The porcupine pufferfish inhabits sandy or gravel bottom seas with a water depth of 2-30 meters. The fish swims slowly and often hides in reef caves. When attacked, the fish inhales seawater to inflate the body into a spherical shape and stick out spines so that predators cannot swallow it. The fish is carnivorous and feeds on zoobenthos.

At present, the porcupine pufferfish on the market are mainly artificially harvested. The flesh is tender and tasty, with high nutritional value; with large individuals and good market prospects, the porcupine pufferfish have great prospects for aquaculture development. Transferring in indoor cement ponds for artificial fry rearing due to high temperatures in summer is not a proven technology. In fact, this is mainly because nutrients are not successfully transformed, leading to a failure of rearing of fries. In general, some porcupine pufferfish fries die at approximately 10 days after rearing, but mouth opening is successful.

SUMMARY

In view of this, the present disclosure sets forth a method for artificial rearing of porcupine pufferfish fries in indoor cement ponds to solve the above problems.

The technical solution of the present disclosure is realized as follows: a method for artificial rearing of porcupine pufferfish fries in indoor cement ponds, including the following steps:

step (1), indoor cement pond preparation arranging diagonal water inlets and central water outlets in an indoor cement pond; disinfecting the indoor cement pond 6-8 days before releasing hatched larvae of porcupine pufferfish into the indoor cement pond; at 3-5 days before releasing, feeding 60 cm of water, fertilizing the water with algal suspension and probiotics until the water turns light green or yellow-green in color and clarity is 30-40 cm for releasing the hatched larvae;

step (2), ponding of newly hatched larvae at a water temperature of 26.0-27.0° C. and a salinity of 30.0-32.0%0 in summer, hatching out fertilized eggs after 100-140 h, and releasing newly artificially hatched larvae at a density of 5,000-8,000 larvae/m³ into the indoor cement pond;

step (3), feeding strategies at different fry rearing stages early stage: at 1-15 days after fries open mouths and newly hatched larvae are 2-2.5 mm in length, feeding the newly hatched larvae with fortified rotifers and *Artemia* nauplii at 1-3 days after opening the mouth, and maintaining a rotifer density of 7-9 rotifers/mL and an *Artemia* nauplius density of 3-5 nauplii/mL; at 4-15 days, feeding the newly hatched larvae with copepods, *Artemia* nauplii and cladocerans in a ratio of (3-5):(2-4):(2-4), and maintaining a food density of 3-5 animals/mL;

middle stage: at 15-20 days, when developing to the postlarval stage, feed the newly hatched larvae with nauplii of *Litopenaeus vannamei* (South American white-leg shrimp) and 1-3 mm *Artemia salina* (brine shrimp), and maintaining a food density of 3-5 animals/mL; at 20-35 days, starting feeding postlarvae with brine shrimps, eel powder, and artificially pelleted compound feed in a mass ratio of 3:(7-9):(5-7), and gradually increasing the amount of the artificially pelleted compound feed as the fries grow;

late stage: at 35-45 days, when developing to the larval stage, starting feeding larvae with the artificially pelleted compound feed, and gradually increasing the particle size of pellet with the growth of fish body, wherein daily feed capacity is 3-5% of the fry body weight, and fries are fed in a satiation manner; cleaning up excessive feed in time; using radiofrequency current stress, where frequency range is 300-800 kHz, stress time is 20-60 s; after Day 45, transferring fries with a total length of more than 2.0 cm into net cages and outdoor ponds for aquaculture;

step (4), water quality management during fry rearing during the fry rearing and feeding, injecting new water in the form of micro-flowing water, discharging bottom sewage in time in the form of intermediate micro-drainage combined with sewage suction, and adding *chlorella* to maintain water clarity; after 20 days of age, stopping adding the *chlorella*, and gradually increasing water exchange rate and aeration rate to reach a daily water exchange rate of more than 200% and a flow rate of pond water of above 0.05 m/s; after 35 days of age, injecting seawater filtered by an ultrafiltration system;

step (5), separate ponding of fries rearing the fries in separate ponds according to different size specifications;

step (6), emergence of fries transferring fries with an average total length of more than 2.0 cm into the net cages or the outdoor ponds for aquaculture.

Further, the indoor cement pond in step (1) may be disinfected as follows: after removing dirt and debris on the walls and bottom of the indoor cement pond, soaking the indoor cement pond with 80-120 mg/L bleaching powder and rinsing off, or soaking the whole pond with 15-25 mg/L KMnO$_4$ solution for 40-50 h, and rinsing the whole pond with seawater for later use.

Further, in step (1), the water may be fertilized as follows: at 3-5 days before releasing hatched larvae of porcupine pufferfish into the indoor cement pond, feeding 60 cm of water, selecting 2-3 g/m$^3$ diatom nutrient compound inorganic salt and 3-5 ml/m$^3$ algal growth-promoting factor to splash the whole pond, activating with 3-5 ml/m$^3$ Effective Microorganisms or 2 ml/m$^3$ *bacillus* preparation and 4 g/m$^3$ brown sugar for 2-4 hours the next morning, mixing with 2 ml/m$^3$ lactic acid bacterial preparation, splashing fertilized water in the whole pond, and releasing the hatched larvae of porcupine pufferfish when a balance between algal phase and bacterial phase is reached, the water turns tan or yellow-green, and the clarity is 30-40 cm.

Further, light intensities at the fry rearing stages in step (3) may be >2,000 lx, 2,000-4,000 lx, and 5,000-10,000 lx at the early, middle, and late stages, respectively.

Further, the artificially pelleted compound feed in step (3) may include the following raw materials: 10-21 parts by weight of allicin, 5-11 parts by weight of fermented green tea residue, 2-5 parts by weight of astaxanthin, and 3-8 parts by weight of sea fish oil.

Further, water quality conditions and environmental factors in the water quality management during the fry rearing in step (4) may be that: seawater for fry rearing needs to be subjected to sand filtration, hatching salinity is 30-32%0, temperature is 26.0-27.0° C., pH is 7.8-8.2, the indoor cement pond has 0.5 aeration heads per square meter, and dissolved oxygen is maintained at >5 mg/L.

Compared with the prior art, the present invention has the following beneficial effects:

(1) The method for artificial rearing of porcupine pufferfish fries in indoor cement ponds provided by the present disclosure maintains an excellent water color, make the fries grow in a better environment, and ensure the growth rate and survival rate thereof by regulating the fry rearing environment, temperature, salinity, dissolved oxygen, pH value, aeration power, ammonia nitrogen, nitrite nitrogen, and light, especially the effect of probiotics on water quality.

(2) The method for artificial rearing of porcupine pufferfish fries in indoor cement ponds provided by the present disclosure adopts staged fry rearing management, adopts different feed ratios based on the fries at different developmental stages, and carries out radiofrequency current stress at the late stage of rearing to stimulate the fish body's anti-stress physiological response. Combined with the artificially pelleted compound feed, the oxidative stress of the fish body is reduced by increasing the body's antioxidant capacity, improving the adaptability of fish to the environment and the physique of the fries. Herein, the artificially pelleted compound feed meets the nutrient requirements of the fries and improves the success rate of fry rearing.

BRIEF DESCRIPTION OF THE DRAWINGS

FIG. 1 is a flow chart of the method for rearing porcupine pufferfish fries in an indoor cement pond according to one embodiment.

DETAILED DESCRIPTION OF THE EMBODIMENTS

In order to better understand the technical content of the present disclosure, specific examples will be provided below to further illustrate the present disclosure.

Unless otherwise specified, all experimental methods used in the examples of the present disclosure are conventional methods.

All materials and reagents used in the examples of the present disclosure may be commercially available, unless otherwise specified.

Example 1

A method for artificial rearing porcupine pufferfish fries in indoor cement ponds was provided, including the following steps:

Step 1 (S1). Indoor Cement Pond Preparation

Each indoor cement pond was 6.0×6.0×1.5 m in volume, and two diagonal water inlets and one central water outlet were arranged. At 7 days before releasing hatched larvae of porcupine pufferfish into the indoor cement pond, drainage and aeration equipment of the indoor cement pond were checked, and the indoor cement pond was disinfected. At 3 days before releasing, after 60 cm of water was fed, the water was fertilized with algal suspension and probiotics, and hatched larvae were released when the water turned light green or yellow-green in color and clarity was 30 cm.

Step 2 (S2). Ponding of Newly Hatched Larvae

At a water temperature of 26.0° C. and a salinity of 30.0%0 in summer, fertilized eggs were hatched out after 100 h, and newly hatched larvae had a total length of approximately 3.3 mm. The newly artificially hatched larvae were released at a density of 5,000 larvae/m$^3$ into the indoor cement pond.

Step 3 (S3). Feeding Management at Different Fry Rearing Stages

Early stage: Fries opened mouths for 1-15 days. The newly hatched larvae with a total length of 2-2.5 mm were fed with fortified rotifers and *Artemia* nauplii, the rotifer density was maintained at 7 rotifers/mL, and the *Artemia* nauplius density was maintained at 3 nauplii/mL; at 4-15 days, the newly hatched larvae were fed with copepods, *Artemia* nauplii and cladocerans in a ratio of 3:2:2, and the food density was maintained at 3 animals/mL.

Middle stage: At 15-20 days, when developing to the postlarval stage, the newly hatched larvae were fed with nauplii of South American white-leg shrimps and about 2 mm brine shrimps, and the food density was maintained at 3 animals/mL; since Day 20, postlarvae were fed with brine shrimps, eel powder, and artificially pelleted compound feed in a ratio of 3:7:5, and the amount of the artificially pelleted compound feed was increased gradually as the fries grew, where the artificially pelleted compound feed included the following raw materials: 10 parts by weight of allicin, 5 parts by weight of fermented green tea residue, 2 parts by weight of astaxanthin, and 3 parts by weight of sea fish oil.

Late stage: At 35-45 days, when developing to the larval stage, larvae started to be fed with the artificially pelleted compound feed, and the particle size of pellet was gradually increased with the growth of fish body, where daily feed capacity was 3% of the fry body weight. The fries were fed in a satiation manner; excessive feed was cleaned up in time; radiofrequency current stress was used, where frequency range was 300 kHz, stress time was 20 s; after Day 45, fries with a total length of more than 2.0 cm were transferred into net cages and outdoor ponds for aquaculture.

Step 4 (S4). Water Quality Management During Fry Rearing

During the fry rearing and feeding, new water was injected in the form of micro-flowing water; bottom sewage was discharged in time in the form of intermediate micro-drainage combined with sewage suction, and *chlorella* was added properly to maintain water clarity; after 20 days of age, the *chlorella* was not added any more; the rate of new water addition was gradually increased, and finally 200% of water was exchanged daily; also, aeration rate was increased gradually to achieve a final flow rate of pond water of 0.05 m/s; after 35 days of age, the injected new water was seawater filtered by an ultrafiltration system, where 99.99% of yellow *Vibrio* species, green *Vibrio* species, luminous *Vibrio* species, *Escherichia coli*, algal cysts, and *Cryptosporidium* oocysts were removed, and 100% of sestons were removed, with a turbidity of ≤0.2 Nephelometric Turbidity Unit (NTU) and a silt density index (SDI) of ≤3. Clean water was used for aquaculture, and the outbreaks of aquatic pests and diseases were checked. The water quality for fry rearing was consistent with the first-class seawater specified in the *Sea Water Quality Standard* (GB3097-1997, China), with a salinity of 30.0%0, a water temperature of 26.0° C., a pH of 7.8, and dissolved oxygen of ≥5 mg/L. Light intensities for fry rearing were controlled at >2,000 lx, 2,000 lx, and 5,000 lx at the early, mid and late stages, respectively.

Step 5 (S5). Separate Ponding of Fries

When there was a substantial difference in fry size, the fries should be divided in time and reared in separate ponds according to different size specifications.

Step 6 (S6). Emergence of Fries

Fries with an average total length of more than 2.0 cm could be transferred into the net cages or the outdoor ponds for aquaculture.

Example 2

A method for artificial rearing porcupine pufferfish fries in indoor cement ponds was provided, including the following steps:

S1. Indoor Cement Pond Preparation

Each indoor cement pond was 6.0×6.0×1.5 m in volume, and two diagonal water inlets and one central water outlet were arranged. At 7 days before releasing hatched larvae of porcupine pufferfish into the indoor cement pond, drainage and aeration equipment of the indoor cement pond were checked, and the indoor cement pond was disinfected. At 5 days before releasing, after 60 cm of water was fed, the water was fertilized with algal suspension and probiotics, and hatched larvae were released when the water turned light green or yellow-green in color and clarity was 40 cm.

S2. Ponding of Newly Hatched Larvae

At a water temperature of 27.0° C. and a salinity of 32.0%0 in summer, fertilized eggs were hatched out after 140 h, and newly hatched larvae had a total length of approximately 3.3 mm. The newly artificially hatched larvae were released at a density of 8,000 larvae/m$^3$ into the indoor cement pond.

S3. Feeding Management at Different Fry Rearing Stages

Early stage: Fries opened mouths for 1-15 days. The newly hatched larvae with a total length of 2-2.5 mm were fed with fortified rotifers and *Artemia* nauplii at 1-3 days after opening the mouth, the rotifer density was maintained at 9 rotifers/mL, and the *Artemia* nauplius density was maintained at 5 nauplii/mL; at 4-15 days, the newly hatched larvae were fed with copepods, *Artemia* nauplii and cladocerans in a ratio of 5:4:4, and the food density was maintained at 5 animals/mL.

Middle stage: At 15-20 days, when developing to the postlarval stage, the newly hatched larvae were fed with nauplii of South American white-leg shrimps and about 2 mm brine shrimps, and the food density was maintained at 5 animals/mL; at 20-35 days, postlarvae were fed with brine shrimps, eel powder, and artificially pelleted compound feed in a ratio of 3:9:7, and the amount of the artificially pelleted compound feed was increased gradually as the fries grew, where the artificially pelleted compound feed included the following raw materials: 21 parts by weight of allicin, 11 parts by weight of fermented green tea residue, 5 parts by weight of astaxanthin, and 8 parts by weight of sea fish oil.

Late stage: At 35-45 days, when developing to the larval stage, larvae started to be fed with the artificially pelleted compound feed, and the particle size of pellet was gradually increased with the growth of fish body, where daily feed capacity was 5% of the fry body weight. The fries were fed in a satiation manner; excessive feed was cleaned up in time; radiofrequency current stress was used, where frequency range was 800 kHz, stress time was 60 s; after Day 45, fries with a total length of more than 2.0 cm were transferred into net cages and outdoor ponds for aquaculture.

S4. Water Quality Management During Fry Rearing

During the fry rearing and feeding, new water was injected in the form of micro-flowing water; bottom sewage was discharged in time in the form of intermediate micro-drainage combined with sewage suction, and *chlorella* was added properly to maintain water clarity; after 20 days of age, the *chlorella* was not added any more; the rate of new water addition was gradually increased, and finally 200% of water was exchanged daily; also, aeration rate was increased gradually to achieve a final flow rate of pond water of 0.05 m/s. After 35 days of age, the injected new water was seawater filtered by an ultrafiltration system, where 99.99% of yellow *Vibrio* species, green *Vibrio* species, luminous *Vibrio* species, *E. coli*, algal cysts, and *Cryptosporidium* oocysts were removed, and 100% of sestons were removed, with a turbidity of ≤0.2 NTU and an SDI of ≤3. Clean water was used for aquaculture, and the outbreaks of aquatic pests and diseases were checked. The water quality for fry rearing was consistent with the first-class seawater specified in the *Sea Water Quality Standard* (GB3097-1997, China), with a salinity of 32.0%0, a water temperature of 28.0° C., a pH of 8.2, and dissolved oxygen of ≥5 mg/L. Light intensities for fry rearing were controlled at >2,000 lx, 4,000 lx, and 8,000 lx at the early, mid and late stages, respectively.

S5. Separate Ponding of Fries

When there was a substantial difference in fry size, the fries should be divided in time and reared in separate ponds according to different size specifications.

S6. Emergence of Fries

Fries with an average total length of more than 2.0 cm could be transferred into the net cages or the outdoor ponds for aquaculture.

Example 3

A method for artificial rearing porcupine pufferfish fries in indoor cement ponds was provided, including the following steps:

S1. Indoor Cement Pond Preparation

Each indoor cement pond was 6.0×6.0×1.5 m in volume, and two diagonal water inlets and one central water outlet were arranged. At 7 days before releasing hatched larvae of porcupine pufferfish into the indoor cement pond, drainage and aeration equipment of the indoor cement pond were checked, and the indoor cement pond was disinfected. At 3-5 days before releasing, after 60 cm of water was fed, the water was fertilized with algal suspension and probiotics, and hatched larvae were released when the water turned light green or yellow-green in color and clarity was 30-40 cm.

S2. Ponding of Newly Hatched Larvae

At a water temperature of 26° C. and a salinity of 31.0%0 in summer, fertilized eggs were hatched out after 120 h, and newly hatched larvae had a total length of approximately 3.3 mm. The newly artificially hatched larvae were released at a density of 6,000 larvae/m³ into the indoor cement pond.

S3. Feeding Management at Different Fry Rearing Stages

Early stage: Fries opened mouths for 1-15 days. The newly hatched larvae with a total length of 2-2.5 mm were fed with fortified rotifers and *Artemia* nauplii at 1-3 days after opening the mouth, the rotifer density was maintained at 8 rotifers/mL, and the *Artemia* nauplius density was maintained at 4 nauplii/mL; at 4-15 days, the newly hatched larvae were fed with copepods, *Artemia* nauplii and cladocerans in a ratio of 4:3:3, and the food density was maintained at 4 animals/mL.

Middle stage: At 15-20 days, when developing to the postlarval stage, the newly hatched larvae were fed with nauplii of South American white-leg shrimps and about 2 mm brine shrimps, and the food density was maintained at 4 animals/mL; at 20-35 days, postlarvae were fed with brine shrimps, eel powder, and artificially pelleted compound feed in a ratio of 3:8:6, and the amount of the artificially pelleted compound feed was increased gradually as the fries grew, where the artificially pelleted compound feed included the following raw materials: 15 parts by weight of allicin, 7 parts by weight of fermented green tea residue, 3 parts by weight of astaxanthin, and 5 parts by weight of sea fish oil.

Late stage: At 35-45 days, when developing to the larval stage, larvae started to be fed with the artificially pelleted compound feed, and the particle size of pellet was gradually increased with the growth of fish body, where daily feed capacity was 4% of the fry body weight. The fries were fed in a satiation manner; excessive feed was cleaned up in time; radiofrequency current stress was used, where frequency range was 500 kHz, stress time was 40 s; after Day 45, fries with a total length of more than 2.0 cm were transferred into net cages and outdoor ponds for aquaculture.

S4. Water Quality Management During Fry Rearing

During the fry rearing and feeding, new water was injected in the form of micro-flowing water; bottom sewage was discharged in time in the form of intermediate micro-drainage combined with sewage suction, and *chlorella* was added properly to maintain water clarity; after 20 days of age, the *chlorella* was not added any more; the rate of new water addition was gradually increased, and finally 200% of water was exchanged daily; also, aeration rate was increased gradually to achieve a final flow rate of pond water of 0.05 m/s. After 35 days of age, the injected new water was seawater filtered by an ultrafiltration system, where 99.99% of yellow *Vibrio* species, green *Vibrio* species, luminous *Vibrio* species, *E. coli*, algal cysts, and *Cryptosporidium* oocysts were removed, and 100% of sestons were removed, with a turbidity of ≤0.2 NTU and an SDI of ≤3. Clean water was used for aquaculture, and the outbreaks of aquatic pests and diseases were checked. The water quality was consistent with the first-class seawater specified in the *Sea Water Quality Standard* (GB3097-1997, China), with a salinity of 31.0%0, a water temperature of 27.0° C., a pH of 8.0, and dissolved oxygen of ≥5 mg/L. Light intensities for fry rearing were controlled at >2,000 lx, 3,000 lx, and 9,000 lx at the early, mid and late stages, respectively.

S5. Separate Ponding of Fries

When there was a substantial difference in fry size, the fries should be divided in time and reared in separate ponds according to different size specifications.

S6. Emergence of Fries

Fries with an average total length of more than 2.0 cm could be transferred into the net cages or the outdoor ponds for aquaculture.

Comparative Example 1

The difference between this comparative example and Example 3 was that: in a method for artificial rearing of porcupine pufferfish fries in indoor cement ponds, in the indoor cement pond preparation in step 51, natural seawater was used for fry rearing without fertilizing the water.

Comparative Example 2

The difference between this comparative example and Example 3 was that: in a method for artificial rearing of porcupine pufferfish fries in indoor cement ponds, in the water quality management during fry rearing in step S4, the water used for fry rearing was sand-filtered seawater that had not been filtered by an ultrafiltration system.

Comparative Example 3

The difference between this comparative example and Example 3 was that: in a method for artificial rearing of porcupine pufferfish fries in indoor cement ponds, the artificially pelleted compound feed at the middle stage of different fry rearing stages included the following raw materials: 25 parts by weight of allicin, 3 parts by weight of fermented green tea residue, 5 parts by weight of astaxanthin, and 2 parts by weight of sea fish oil.

Comparative Example 4

The difference between this comparative example and Example 3 was that: in a method for artificial rearing of porcupine pufferfish fries in indoor cement ponds, radiofrequency current stress was not used at different fry rearing stages.

1. Result Determination

In the present disclosure, the specific growth rate in wet weight and the survival rate of the porcupine pufferfish fries obtained in the foregoing Examples 1 to 3 and Comparative Examples 1 to 4 were calculated, and the results are shown in Table 1.

| Group | Specific growth rate in wet weight $SGR_W$ (%) | Survival rate (%) |
|---|---|---|
| Example 1 | 2.6 | 11.2 |
| Example 2 | 2.4 | 10.1 |
| Example 3 | 2.3 | 9.6 |
| Comparative Example 1 | 1.9 | 6.4 |
| Comparative Example 2 | 1.7 | 5.7 |
| Comparative Example 3 | 1.5 | 5.5 |
| Comparative Example 4 | 1.4 | 5.3 |

FIG. 1 is a flow chart of a method for rearing porcupine pufferfish fries in an indoor cement pond according to one embodiment.

In operation 120, the method includes preparing an indoor cement pond. In one embodiment, the indoor cement pond may have diagonal water inlets and a central water outlet. In one embodiment, operation 120 may include disinfecting the indoor cement pond 6-8 days before releasing hatched larvae of porcupine pufferfish into the indoor cement pond, and regulating water quality 3-5 days before releasing the hatched larvae.

In operation 130, the method includes transferring hatched larvae into the indoor cement pond. In one embodiment, operation 130 may include releasing hatched larvae into the indoor cement pond at a density of 5,000-8,000 larvae/m$^3$. The larvae may be hatched from fertilized eggs at a water temperature of 26.0-27.0° C. and a salinity of 30.0-32.0‰ that have been maintained for 100-140 hours.

In operation 140, the method includes feeding and managing the larvae at different sub-stages of the rearing stage. In one embodiment, during an early rearing stage within the first 15 days after the larvae open mouths and are 2-2.5 mm in length, operation 140 may include feeding the larvae with fortified rotifers and *Artemia* nauplii at a rotifer density of 7-9 rotifers/mL and an *Artemia* nauplius density of 3-5 nauplii/mL during days 1 to 4 of the rearing stage. Operation 140 may include feeding the larvae with copepods, *Artemia* nauplii and cladocerans in a ratio of (3-5):(2-4):(2-4) at a food density of 3-5 animals/mL during days 4 to 15 of the rearing stage. During a middle rearing stage spanning the next 20 days after the early rearing stage, operation 140 may include feeding the larvae with nauplii of *Litopenaeus vannamei* (South American white-leg shrimp) and 1-3 mm *Artemia salina* (brine shrimp) at a food density of 3-5 animals/mL during days 15-20 of the rearing stage. Operation 140 may include feeding the larvae with brine shrimps, eel powder, and artificially pelleted compound feed in a mass ratio of 3:(7-9):(5-7) by gradually increasing an amount of the artificially pelleted compound feed as the larvae grow during days 20-35 of the rearing stage. During a late rearing stage spanning the next 10 days after the middle rearing stage, operation 140 may include feeding the larvae in a satiation manner with the artificially pelleted compound feed by gradually increasing particle size of the artificially pelleted compound feed as the larvae grow during days 35-45 of the rearing stage. The daily feed capacity may be 3-5% of body weight of the larvae. Operation 140 may include cleaning up excessive feed in time and stimulating an anti-stress physiological response of the larvae.

In operation 150, the method includes managing water quality during the rearing of the larvae into fries. In one embodiment, operation 150 may include injecting new water in a form of micro-flowing water, discharging bottom sewage in a form of intermediate micro-drainage combined with sewage suction, adding *chlorella* to maintain water clarity for 20 days during the rearing stage, gradually increasing a water exchange rate and an aeration rate to reach a daily water exchange rate of more than 200% and a flow rate of pond water of above 0.05 m/s, and injecting seawater filtered by an ultrafiltration system after day 35 of the rearing stage.

In operation 160, the method includes separating the fries into different indoor cement ponds based on the size of the fries.

In operation 170, the method includes transferring fries into net cages or outdoor ponds for aquaculture after the rearing stage when the fries reach a minimum length. In one embodiment, operation 170 may include transferring fries with an average total length of more than 2.0 cm into net cages or outdoor ponds for aquaculture after 45 days of the rearing stage.

The method for artificial rearing of porcupine pufferfish fries in indoor cement ponds provided by the present disclosure regulates the fry rearing environment in terms of temperature, salinity, dissolved oxygen, pH value, aeration power, ammonia nitrogen, nitrite nitrogen, and light, making the fries grow in a better environment; staged management is coordinated with a scientifically proportioned feed to meet the nutrient requirement of fries and improve the success rate of fry rearing.

The above descriptions are only preferred examples of the present disclosure and are not intended to limit the present disclosure. Any modification, equivalent substitution, and improvement made within the spirit and principle of the present disclosure shall be included in the protection scope of the present disclosure.

What is claimed is:

1. A method for artificial rearing of porcupine pufferfish fries in indoor cement ponds, comprising:
   Preparing an indoor cement pond that includes:
      Arranging diagonal water inlets and a central water outlets in the indoor cement pond;
      Disinfecting the indoor cement pond 6-8 days before releasing hatched larvae of porcupine pufferfish into the indoor cement pond; and
      Regulating water quality at 3-5 days before said releasing;
   Releasing hatched larvae into the indoor cement pond at a density of 5,000-8,000 larvae/m$^3$, the hatched larvae having been hatched from fertilized eggs at a water temperature of 26.0-27.0° C. and a salinity of 30.0-32.0‰ maintained for 100-140 hours;
   Waiting until a rearing stage when the larvae are 2-2.5 mm in length;
   Feeding the larvae with fortified rotifers and *Artemia* nauplii by maintaining a rotifer density of 7-9 rotifers/mL and an *Artemia* nauplius density of 3-5 nauplii/mL during days 1 to 4 of the rearing stage;
   Feeding the larvae with copepods, *Artemia* nauplii and cladocerans in a ratio of (3-5):(2-4):(2-4) by maintaining a food density of 3-5 animals/mL during days 4 to 15 of the rearing stage;
   Feeding the larvae with nauplii of *Litopenaeus vannamei* (South American white-leg shrimp) and 1-3 mm *Artemia salina* (brine shrimp) by maintaining a food density of 3-5 animals/mL during days 15-20 of the rearing stage;
   Feeding the larvae with brine shrimps, eel powder, and artificially pelleted compound feed in a mass ratio of 3:(7-9):(5-7), and gradually increasing an amount of the artificially pelleted compound feed as the larvae grow during days 20-35 of the rearing stage;
   Feeding the larvae in a satiation manner with the artificially pelleted compound feed, and gradually increasing particle size of the artificially pelleted compound feed as the larvae grow during days 35-45 of the rearing stage, wherein a daily feed capacity is 3-5% of body weight of the larvae;
   Cleaning up excessive feed in time;
   Stimulating anti-stress physiological response of the larvae using radiofrequency current stress;
   Managing water quality during the rearing stage that includes:
      Injecting new water in a form of micro-flowing water;
      Discharging bottom sewage in time in a form of intermediate micro-drainage combined with sewage suction;
      Adding *chlorella* to maintain water clarity for 20 days during the rearing stage;

Gradually increasing a water exchange rate and an aeration rate to reach a daily water exchange rate of more than 200% and a flow rate of pond water of above 0.05 m/s; and Injecting seawater filtered by an ultrafiltration system after day 35 of the rearing stage;

Rearing fries that emerge from the larvae in separate ponds according to different size specifications; and Transferring fries with an average total length of more than 2.0 cm into net cages or outdoor ponds for aquaculture after 45 days of the rearing stage;

Wherein said regulating water quality step includes:

Feeding water to 60 cm in depth in the indoor cement pond, and fertilizing the water with algal suspension and probiotics until the water turns light green or yellow-green in color and water clarity is 30-40 cm, and Wherein said stimulating anti-stress physiological response of the larvae step includes using the radiofrequency current stress with a frequency range is 300-800 kHz for a stress time of 20-60 seconds.

2. The method according to claim 1, wherein said disinfecting the indoor cement pond step comprises:

Removing dirt and debris from walls and a bottom of the indoor cement pond;

Soaking the indoor cement pond with 80-120 mg/L bleaching powder or with 15-25 mg/L $KMnO_4$ solution for 40-50 hours; and Rinsing the indoor cement pond with seawater.

3. The method according to claim 1, wherein said fertilizing the water step comprises:

Feeding water to 60 cm in depth 3-5 days before said releasing;

Selecting 2-3 $g/m^3$ diatom nutrient compound inorganic salt and 3-5 $ml/m^3$ algal growth-promoting factor to splash the indoor cement pond;

Activating with 3-5 $ml/m^3$ Effective Microorganisms or 2 $ml/m^3$ *bacillus* preparation and 4 $g/m^3$ brown sugar for 2-4 hours at a next morning;

Mixing with 2 $ml/m^3$ lactic acid bacterial preparation;

Splashing water as fertilized in the indoor cement pond; and

Releasing the hatched larvae when a balance between algal phase and bacterial phase is reached, the water turns tan or yellow-green, and the water clarity is 30-40 cm.

4. The method according to claim 1, further comprising:

using light with intensities of >2,000 lux during days 1-15 of the rearing stage;

using light with intensities of 2,000-4,000 lux during days 15-25 of the rearing stage; and using light with intensities of 5,000-10,000 lux after day 25 of the rearing stage.

5. The method according to claim 1, wherein the artificially pelleted compound feed comprises:

10-21 parts by weight of allicin;

5-11 parts by weight of fermented green tea residue;

2-5 parts by weight of astaxanthin; and 3-8 parts by weight of sea fish oil.

6. The method according to claim 1, wherein said managing the water quality during the rearing stage step further comprises:

Filtering seawater to remove sand; and

Maintaining the water quality so that salinity is 30.0-32.0‰, temperature is 26.0-27.0° C., pH is 7.8-8.2, aeration heads per square meter is 0.5, and dissolved oxygen is maintained at >5 mg/L.

* * * * *